(12) United States Patent
Rajendran et al.

(10) Patent No.: US 7,979,144 B2
(45) Date of Patent: Jul. 12, 2011

(54) SYSTEM FOR FORMING PATTERNS ON A MULTI-CURVED SURFACE

(75) Inventors: Sankerlingam Rajendran, Plano, TX (US); Billy D. Ables, Richardson, TX (US)

(73) Assignee: Raytheon Company, Waltham, MA (US)

( * ) Notice: Subject to any disclaimer, the term of this patent is extended or adjusted under 35 U.S.C. 154(b) by 364 days.

(21) Appl. No.: 12/249,642

(22) Filed: Oct. 10, 2008

(65) Prior Publication Data

US 2009/0110265 A1 Apr. 30, 2009

Related U.S. Application Data

(60) Provisional application No. 60/979,293, filed on Oct. 11, 2007.

(51) Int. Cl.
*G06F 19/00* (2011.01)
(52) U.S. Cl. ............. 700/61; 700/97; 700/98; 430/318; 219/121.68
(58) Field of Classification Search .................. 700/61, 700/97, 98; 430/318; 219/121.68
See application file for complete search history.

(56) References Cited

U.S. PATENT DOCUMENTS

| | | | | |
|---|---|---|---|---|
| 5,208,603 | A | 5/1993 | Yee | 343/909 |
| 5,472,828 | A * | 12/1995 | Akins et al. | 430/318 |
| 5,949,387 | A | 9/1999 | Wu et al. | 343/909 |
| 6,172,412 | B1 * | 1/2001 | Wein et al. | 257/664 |
| 6,820,046 | B1 * | 11/2004 | Lamson et al. | 703/14 |
| 7,284,224 | B2 * | 10/2007 | Wang et al. | 174/261 |
| 7,461,444 | B2 * | 12/2008 | Deaett et al. | 29/600 |
| 2001/0018761 | A1 * | 8/2001 | Sasaki et al. | 716/15 |
| 2004/0150490 | A1 * | 8/2004 | Smith et al. | 333/33 |
| 2004/0262277 | A1 | 12/2004 | Mika et al. | |
| 2006/0102601 | A1 * | 5/2006 | Shirk et al. | 219/121.68 |
| 2006/0118328 | A1 * | 6/2006 | Wang et al. | 174/250 |

FOREIGN PATENT DOCUMENTS

GB 2 074 084 10/1981

OTHER PUBLICATIONS

"Measurement of Electrotextiles for High Frequency Applications", Ouyang et al, Perdue University, IEEE, 2005.*
"Experimental Verification and Simulation of Negative INdex of Refraction using Snell's Law", Parazzoli et al, Boeing, The American Physical Society,Physical Review Letters, Volumne 90, No. 10, Mar. 2003.*
PCT Notification of the Trasnmittal of the International Search Report and the Written Opinion of the ISA regarding PCT Application No. US2008/079558 (13pages), Feb. 17, 2009.

* cited by examiner

*Primary Examiner* — Michael D Masinick
(74) *Attorney, Agent, or Firm* — Baker Botts L.L.P.

(57) ABSTRACT

According to one embodiment, a pattern forming system includes a patterning tool, a multi-axis robot, and a simulation tool that are coupled to a pattern forming tool that is executed on a suitable computing system. The pattern forming tool receives a contour measurement from the patterning tool and transmits the measured contour to the simulation tool to model the electrical characteristics of a conductive pattern or a dielectric pattern on the measured contour. Upon receipt of the modeled characteristics, the pattern forming system may adjust one or more dimensions of the pattern according to the model, and subsequently create, using the patterning tool, the corrected pattern on the surface.

24 Claims, 3 Drawing Sheets

SYSTEM FOR FORMING PATTERNS ON A MULTI-CURVED SURFACE

RELATED APPLICATIONS

This application claims priority to U.S. Provisional Patent Application Ser. No. 60/979,293, entitled "SYSTEM FOR FORMING A CONDUCTIVE PATTERN ON A MULTI-DIMENSIONAL SURFACE," which was filed on Oct. 11, 2007.

TECHNICAL FIELD OF THE DISCLOSURE

This disclosure generally relates to conductive and dielectric patterns, and more particularly, to a system and method for forming a conductive pattern or a dielectric pattern on a multi-curved surface.

BACKGROUND OF THE DISCLOSURE

Antennas are typically used to transmit and receive electromagnetic radiation using various types of conductive elements. To protect these elements, a protective covering commonly referred to as a radome may be placed over the antenna. The radome protects the elements of the antenna from various environmental aspects, such as precipitation, humidity, solar radiation, or other forms of debris that may compromise its performance.

SUMMARY OF THE DISCLOSURE

According to one embodiment, a pattern forming system includes a patterning tool, a multi-axis robot, and a simulation tool that are coupled to a pattern forming tool that is executed on a suitable computing system. The pattern forming tool receives a contour measurement from the patterning tool and transmits the measured contour to the simulation tool to model the electrical characteristics of a conductive pattern or a dielectric pattern on the measured contour. Upon receipt of the modeled characteristics, the pattern forming system may adjust one or more dimensions of the pattern according to the model, and subsequently create, using the patterning tool, the corrected pattern on the surface.

Some embodiments of the invention provide numerous technical advantages. Some embodiments may benefit from some, none, or all of these advantages. For example, according to one embodiment, conductive patterns or dielectric patterns may be formed on objects, such as radomes with relatively little or no seams or discontinuities. The system according to the teachings of the present disclosure may also provide adaptive dimensional scaling based on size and contour variations of the object such that a relatively continuous pattern is formed over its surface. For objects such as radomes, the relatively continuous pattern may enhance the electro-magnetic performance of the antenna.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

To enhance the performance of antennas and/or to reduce unwanted detection, radomes may be configured with a frequency selective surface (FSS). The frequency selective surface generally includes a conductive material that is formed into a conductive pattern on the surface of the radome. Because many radomes have an outer surface that curves in multiple directions, however, creating seamless frequency selective surfaces on these radomes may be relatively difficult to achieve.

Known attempts for creating conductive patterns on radomes, such as frequency selective surfaces, have included mechanical machining techniques using multi-axis lathes. Using this known process, portions of a layer of conductive material are selectively removed from the multi-curved surface of the radome. These multi-axis lathes may also inadvertently remove excessive amounts of the radome's surface if mis-aligned improperly during the machining process. This process, therefore, may be relatively expensive and time consuming. The mechanical machining technique also does not compensate for typical variations or slight irregularities that may be encountered in a number of radomes manufactured according to a particular process.

Figure 1:
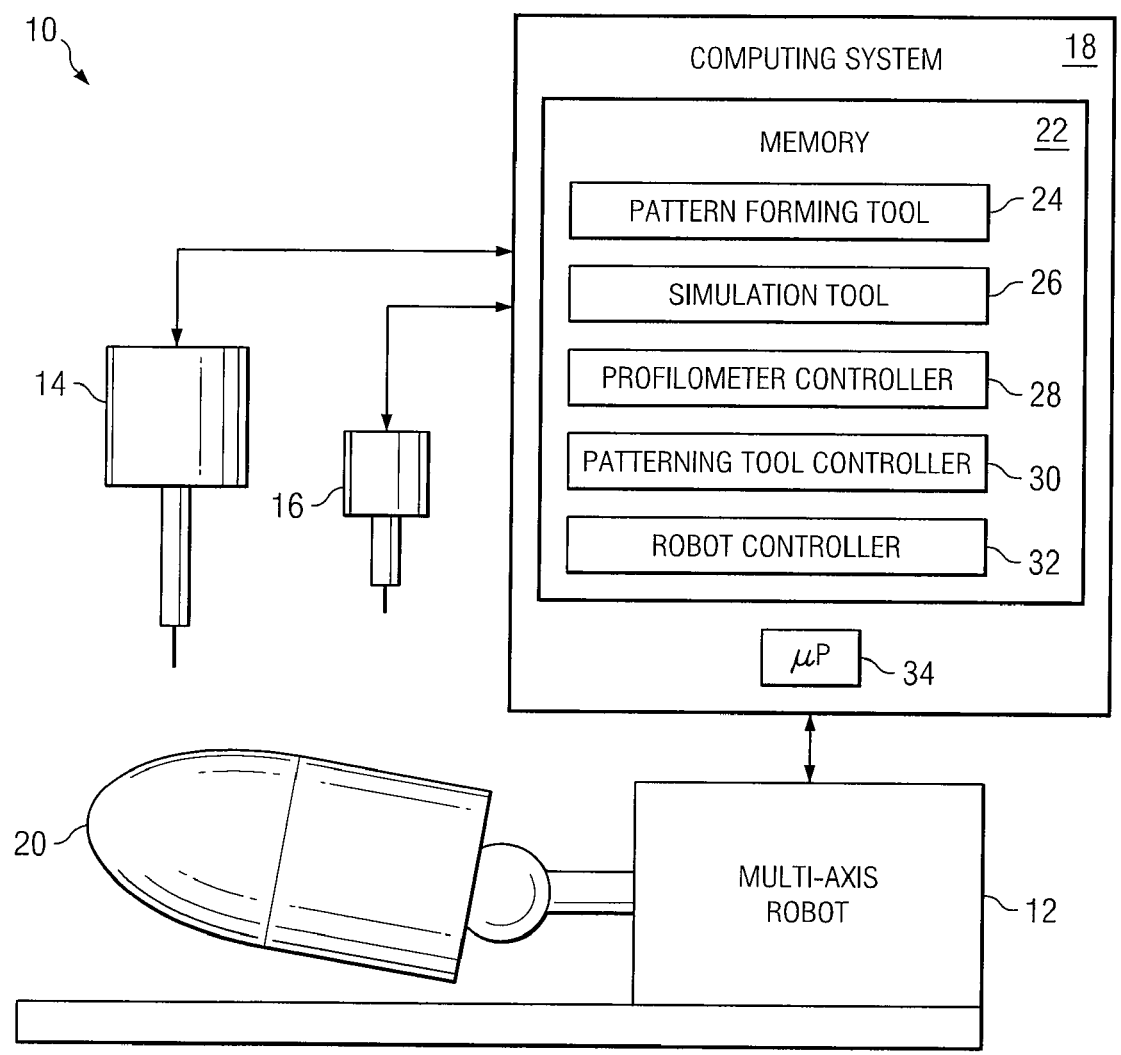
FIG. 1 is a diagram showing one embodiment of a system for forming a conductive pattern or a dielectric pattern on a multi-curved object according to the teachings of the present disclosure.

FIG. 1 shows one embodiment of a pattern forming system 10 that may provide a solution to this problem as well as other problems. Pattern forming system 10 generally includes a multiple axis robot 12, a patterning tool 14, and a profilometer 16 that are each coupled to a computing system 18 for forming a conductive pattern or a dielectric pattern on a surface of an object, which in this particular embodiment, is a radome 20.

Computing system 18 has a memory 22 for storage of a pattern forming tool 24, an electrical simulation tool 26, a profilometer controller 28, a patterning tool controller 30, and a robot controller 32 that may be executed by a processor 34. According to the teachings of the present disclosure, pattern forming tool 24 measures the contour of radome 20 using profilometer 16, derives a model of a conductive pattern or a dielectric pattern using electrical simulation tool 26, adjusts one or more dimensions of the pattern according to the measured dimensions and the derived model, and forms, using the adjusted dimensions, the conductive pattern on radome 20.

Although the present embodiment is directed to the formation of a conductive pattern on a radome 20, the teachings of the present disclosure may be applied to the formation of a conductive pattern or a dielectric pattern on any suitable surface, particularly those having multi-curved surfaces. A multi-curved surface generally refers to any type of surface of an object that curves in more than one direction. Examples of other multi-curved surfaces that may benefit from teachings of the present disclosure include various portion of the surface of an aircraft, or a missile. Moreover, other types of conductive patterns or dielectric patterns, such as antennas may be formed by pattern forming system 10. For example, a combination of multiple conductive patterns and alternating dielectric patterns may be formed in layers on a particular surface in which one or more of the dielectric patterns may be used form air bridges or other structures on the surface.

Multi-axis robot 12 may be any suitable device that is configured to manipulate the orientation of the radome 20 in more than one axis. Multi-axis robot 12 may be controlled by robot controller 32 executed on computing system 18 such that movement of the radome 20 may be coordinated with operation of the patterning tool 14. In this manner, radome 20 may be rotated along multiple axes for measurement of its outer contour and forming a pattern on its outer surface.

In the particular embodiment shown, a profilometer 16 is provided for measuring the contour of radome 20. In other embodiments, the contour of radome 20 may be measured using any suitable device that profiles the contour of radome 20. One example of a profilometer 16 includes a laser that projects a light beam onto the surface of radome 20 while multi-axis robot 12 rotates radome 20 along multiple axes. Sensors configured on profilometer 16 measure light reflected from the surface of radome 20 to determine its position at multiple locations of its surface. These multiple positions may be stored in memory 22 as a locus of points and used by electrical simulation tool 26 to model the electrical characteristics of a conductive or dielectric pattern.

Patterning tool 14 creates a pattern on radome 20 under control of pattern forming tool 24 by patterning tool controller 30 executed on computing system 18. Patterning tool 14 may by any suitable process for generating a conductive or a dielectric pattern. In one embodiment, patterning tool 14 forms the conductive or dielectric pattern on the radome 20 using a lithographic process. The lithographic process generally includes a light generating device that may be modulated by a digital multi-mirror device (DMD), or other similar device, for selectively exposing certain portions of a photo resist material disposed on the surface of radome 20. In particular embodiments, light generating device configured on patterning tool 14 is a laser.

Pattern forming tool 24 includes a set of program instructions that are stored in memory 22 and executed on processor 34 of computing system 18. Computing system 18 also executes electrical simulation tool 26, and controls operation of multi-axis robot 12, profilometer 16, and patterning tool 14 through robot controller 32, profilometer controller 28, and patterning tool controller 30, respectively. Computing system 18 may include any suitable type of computing device that may be, for example, a network coupled computing system or a stand-alone computer. The stand-alone computer may be, for example, a personal computer, a laptop computer, a mainframe computer, or a personal digital assistant (PDA). The network computing system may be a number of computers coupled together via a network, such as a local area network (LAN), a metropolitan area network (MAN), or a wide area network (WAN). For example, computing system 18 may be a network computing system in which a stand-alone computer executes program instructions of pattern forming tool 24 and electrical simulation tool 26, and communicates control signals to another stand-alone computer that controls operation of patterning tool 14 and/or multi-axis robot 12.

Electrical simulation tool 26 includes program instructions stored in a memory and executed on computing system 18 and may include any suitable software driven tool that models the electrical characteristics of a conductive pattern or a dielectric pattern. Electrical simulation tool 26 receives dimensional aspects of a pattern geometry and generates a model according to its dimensional aspects. Examples of suitable electrical simulation tools may include, Microwave Office available from Applied Wave Research, Incorporated with headquarters in El Segundo, Calif., Designer (linear, nonlinear, and System simulator engines) or Nexxim (new linear, nonlinear, etc. engine underpinning newer versions of Designer) available from Ansoft Corporation in Pittsburgh, Pa., or Agilent's EDA Software (ADS), available from Agilent Technologies with headquarters in Palo Alto, Calif.

Figure 2B:
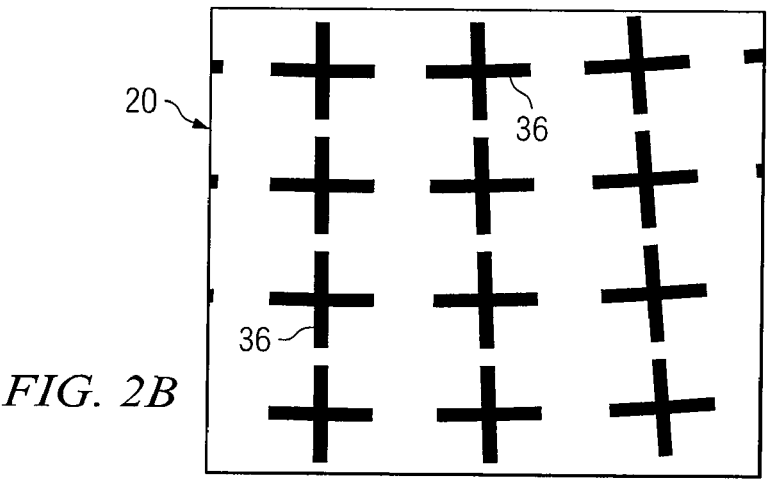
FIG. 2B is an enlarged, partial view of the conductive pattern formed on the radome of FIG. 2A.
Figure 2A:
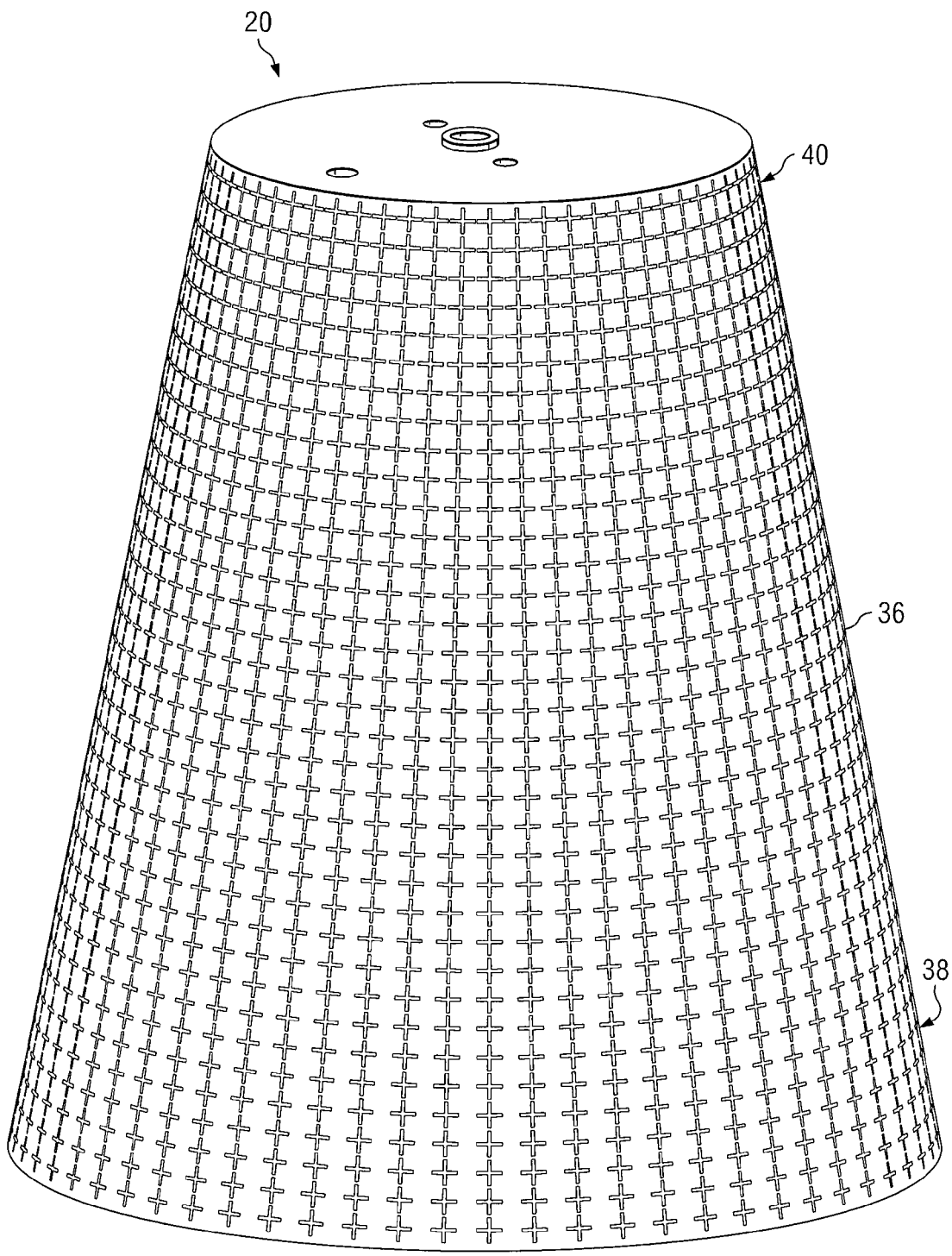
FIG. 2A is a perspective view of an example conductive pattern formed on a radome using the system of FIG. 1.

FIGS. 2A and 2B show a perspective view and a partial, enlarged view, respectively, of radome 20 on which a conductive pattern 36 may be formed using pattern forming system 10. In the particular embodiment shown, radome 20 is generally frusto-conical in shape having a conductive pattern 36 that forms a frequency selective surface. Conductive pattern 36 has multiple cross-like elements that are relatively small in size. Due to the generally frusto-conical shape of radome 20, the dimensions of the cross-like elements of conductive pattern 36 as well as the spacing between them may be relatively difficult to control during manufacture. For example, the spacing of the cross-like elements of conductive pattern 36 proximate to the bottom portion 38 of radome 20 may be relatively greater than the spacing proximate its upper portion 40. The radome 20 may also have slight irregularities in its surface that may cause the dimensions of the cross-like elements or the spacing between each other to exceed desirable limits. To compensate for this inherent problem, pattern forming tool 24 adjusts the dimensions of the cross-like elements of conductive pattern 36 and the spacing between them according to measurements of radome 20 and simulation results from electrical simulation tool 26.

Figure 3:
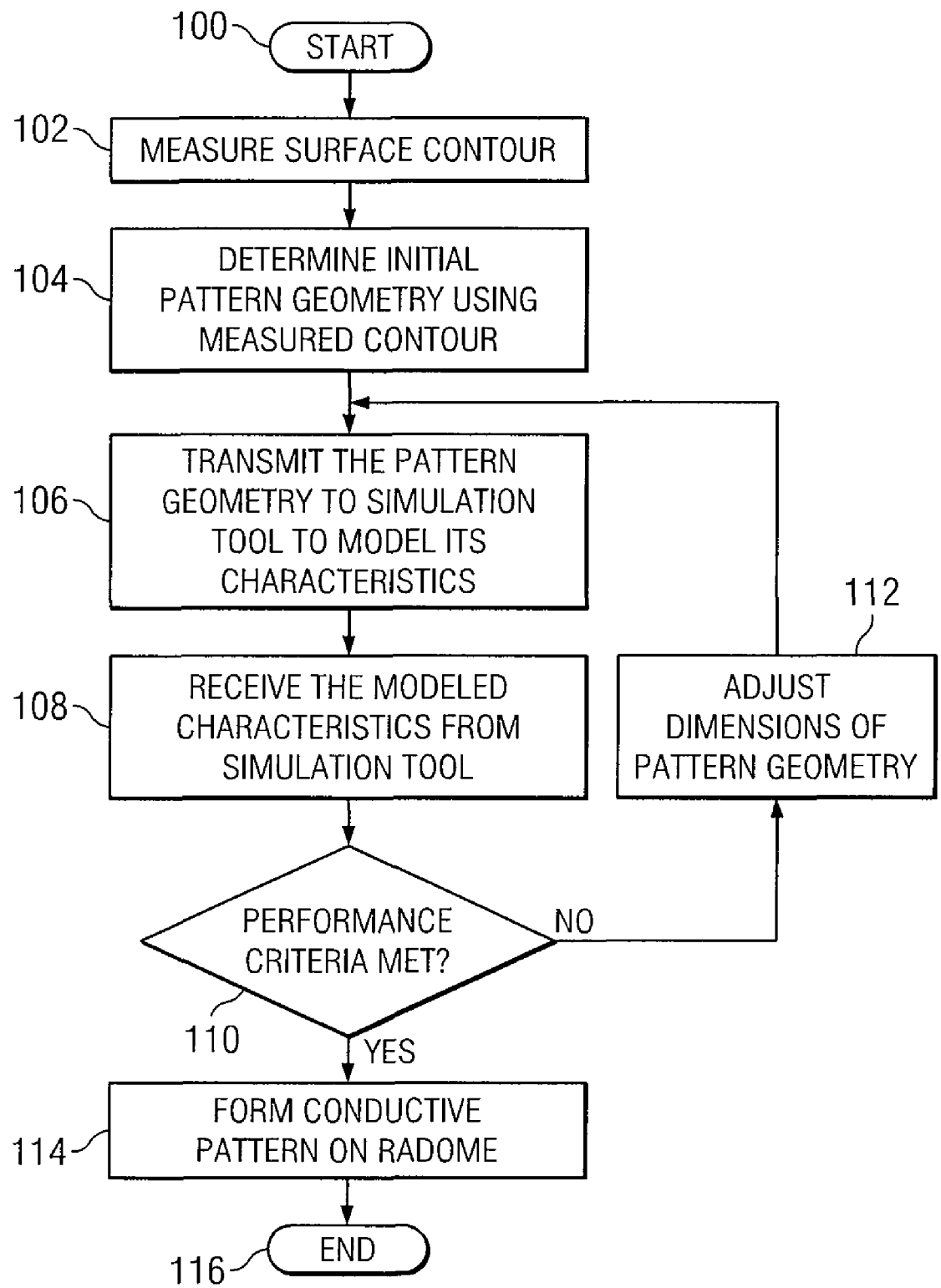
FIG. 3 is a flowchart showing one embodiment of a series of actions that may be performed by the pattern forming system of FIG. 1 to form a conductive pattern or a dielectric pattern on the radome of FIGS. 2A and 2B.

FIG. 3 shows one embodiment of a series of actions that may be performed by pattern forming tool 24 to form a conductive pattern or a dielectric pattern on a surface, such as a frequency selective surface, on a radome 20 as shown in FIGS. 2A and 2B. Although the process is described in reference to FIGS. 2A and 2B having a conductive pattern 36, the process may also be applied to the creation of dielectric patterns as well. In act 100, the process is initiated.

In act 102, pattern forming tool 24 measures the actual surface contour of radome 20 using profilometer 16. To measure the contour of radome 20, pattern forming tool 24 coordinates the operation of multi-axis robot 12 and profilometer 16. In one embodiment, pattern forming tool 24 manipulates multi-axis robot 12 to rotate radome 20 in multiple directions while profilometer 16 generates a locus of points of its position at various locations.

In act 104, pattern forming tool 24 determines an initial pattern geometry using the received measurements. In one embodiment, the pattern geometry generally refers to a three-dimensional representation of conductive pattern 36 that may be stored in the memory of computing system 18.

In act 106, pattern forming tool 24 transmits the generated representation of conductive pattern 36 to electrical simulation tool 26 in order to obtain a model of its electrical characteristics. For example, pattern forming tool 24 may instruct electrical simulation tool 26 to generate a model of anticipated electrical characteristics over various portions of the surface of radome 20 at one or more frequency ranges of interest.

In act 108, pattern forming tool 24 receives the model of electrical characteristics associated with the conductive pattern geometry calculated by electrical simulation tool. The model may include various electrical aspects of the conductive pattern geometry, such as a distributed impedance and/or reflected energy over its surface within a specified frequency range.

In act 110, pattern forming tool 24 compares the received model with one or more performance criteria. If the desired performance criteria are met, processing continues at act 114.

However, if the desired performance criteria are not met, processing continues at act 112.

In act 112, one or more dimensions of the pattern geometry are adjusted. In one embodiment, pattern forming tool 24 computes a scaling factor to the pattern geometry according to variations in the radome's dimensions from nominal values. For example, a number of radomes 18 manufactured according to a particular process may have an outside diameter dimension that varies slightly between one another. The computing system 18 may operable to incorporate a scaling factor for each radome 20 according to its particular variation in outside diameter from a nominal value.

In one embodiment, pattern forming tool 24 may calculate an scaling factor that does not unduly affect other aspects of conductive pattern 36 created according to the adjusted pattern geometry. For example, adjustment of a particular dimension of the pattern geometry may reduce poor electrical characteristics due to a discontinuity of the repeating pattern of conductive pattern 36. This adjustment, however, may cause relatively poor performance within a certain frequency range due to its deviation in the resulting size of elements forming the conductive pattern 36. Thus, pattern forming tool 24 may adjust the one or more dimensions according to various design criteria associated with operation of conductive pattern 36. Once one or more dimensions of the pattern geometry are adjusted, processing continues at act 106 in which acts 106 through 110 are repeated.

As stated previously, if the desired performance criteria are met in act 108, processing continues at act 114. In act 114, pattern forming tool 24 controls patterning tool 14 and multi-dimensional robot 12 to form the modified conductive pattern 36 on radome 20.

Pattern forming tool 24 may form conductive pattern 36 on radome 20 in any suitable manner. In one embodiment, pattern forming tool 24 may use a plate and etch process to form conductive pattern 36 on radome 20. The plate and etch process generally describes a particular conductive pattern technique in which a conductive material, such as copper is initially plated on the surface of radome 20 and an outer layer of photo resist applied. After patterning tool 14 emits a light beam to ablate specified portions of the photo resist layer, the remaining pattern formed on copper layer is etched to form the desired pattern. In another embodiment, pattern forming tool 24 may use a pattern and plate process to form conductive pattern 36 on radome 20. The pattern and plate process generally describes a pattern forming tool whereby a conductive seed layer and a resist layer are formed on radome. Portions of the resist layer may be ablated by pattern forming tool 24. A plating process is then used to build up the desired pattern formed by conductive seed layer.

In act 116, the conductive pattern 36 is formed on radome 20 and the process is ended.

Modifications, additions, or omissions may be made to the method without departing from the scope of the invention. The method may include more, fewer, or other acts. For example, pattern forming and contour measurement tool 14 may comprise independently operating tools in which one forms conductive pattern 36 on radome 20 while the other measures the contour of the surface of radome 20.

Although several embodiments have been illustrated and described in detail, it will be recognized that substitutions and alterations are possible without departing from the spirit and scope of the present disclosure, as defined by the following claims.

What is claimed is:

1. A pattern forming system comprising:
   a multi-axis robot operable to rotate an object having a surface through multiple axes;
   a profilometer operable to measure a contour of the surface;
   a patterning tool;
   a simulation tool operable to model characteristics of a conductive pattern or a dielectric pattern on the contour of the surface based on measurements from the profilometer; and
   a pattern forming tool coupled to the multi-axis robot, the profilometer, the patterning tool, and the simulation tool, the pattern forming tool operable to;
   receive a contour measurement of the surface from the patterning tool;
   transmit the measured contour to the simulation tool;
   receive, from the simulation tool, a model of the characteristics of a conductive pattern or a dielectric pattern on the measured contour;
   adjust one or more dimensions of the conductive pattern or the dielectric pattern according to the model; and
   create, using the patterning tool, the conductive pattern or the dielectric pattern on the surface.

2. The pattern forming system of claim 1, wherein the pattern forming tool is operable to iteratively adjust the one or more dimensions according to successive models received from the simulation tool.

3. The pattern forming system of claim 1, wherein the surface is a doubly curved surface.

4. The pattern forming system of claim 3, wherein the doubly curved surface comprises a radome surface.

5. The pattern forming system of claim 1, wherein the conductive pattern comprises a frequency selective surface.

6. The pattern forming system of claim 1, wherein the pattern forming tool is operable to receive the measurement of the contour by manipulating the orientation of the surface using a multi-axis robot.

7. The pattern forming system of claim 1, wherein the patterning tool is operable to create the conductive pattern or the dielectric pattern using a lithographic process.

8. The pattern forming system of claim 1, wherein the pattern forming tool is operable to adjust the one or more dimensions according to a variation of the contour from a nominal size.

9. A method comprising:
   receiving a contour measurement of a surface from a patterning tool;
   modeling the characteristics of a conductive pattern or a dielectric pattern on the measured contour;
   adjusting one or more dimensions of the conductive pattern or the dielectric pattern according to the modeled characteristics; and
   creating the conductive pattern or the dielectric pattern on the surface.

10. The method of claim 9, further comprising iteratively adjusting the one or more dimensions according to successive models received from the simulation tool.

11. The method of claim 9, wherein receiving the contour measurement of the surface comprises receiving the contour measurement of a doubly curved surface.

12. The method of claim 11, wherein receiving the contour measurement of a doubly curved surface comprises receiving the contour measurement of a radome.

13. The method of claim 9, wherein creating the conductive pattern on the surface comprises creating a frequency selective surface on the surface.

14. The method of claim 9, wherein receiving a contour measurement of a surface comprises manipulating the orientation of the surface using a multi-axis robot.

15. The method of claim 9, wherein creating the conductive pattern on the surface comprises creating the conductive pattern using a lithographic process.

16. The method of claim 9, further comprising adjusting the one or more dimensions according to a variation of the contour from a nominal size.

17. Code implemented on a computer-readable storage medium, operable, when executed by a computer, to perform at least the following:
   receive a contour measurement of a surface from a patterning tool;
   model the characteristics of a conductive pattern or a dielectric pattern on the measured contour;
   adjust one or more dimensions of the conductive pattern or the dielectric pattern according to the model; and
   create the conductive pattern or the dielectric pattern on the surface.

18. The code of claim 17, further comprising iteratively adjusting the one or more dimensions according to successive models received from the simulation tool.

19. The code of claim 17, wherein receiving the contour measurement of the surface comprises receiving the contour measurement of a doubly curved surface.

20. The code of claim 19, wherein receiving the contour measurement of a doubly curved surface comprises receiving the contour measurement of a radome.

21. The code of claim 17, wherein creating the conductive pattern on the surface comprises creating a frequency selective surface on the surface.

22. The code of claim 17, wherein receiving a contour measurement of a surface comprises manipulating the orientation of the surface using a multi-axis robot.

23. The code of claim 17, wherein creating the conductive pattern on the surface comprises creating the conductive pattern using a lithographic process.

24. The code of claim 17, further comprising adjusting the one or more dimensions according to a variation of the contour from a nominal size.

* * * * *